United States Patent
Jacobs

(10) Patent No.: US 6,866,036 B2
(45) Date of Patent: Mar. 15, 2005

(54) COOKING HEAT ABSORBER

(76) Inventor: Eugene Albert Jacobs, 8820 Walther Blvd. Apt. 4521, Baltimore, MD (US) 21234

( * ) Notice: Subject to any disclaimer, the term of this patent is extended or adjusted under 35 U.S.C. 154(b) by 0 days.

(21) Appl. No.: 10/630,047

(22) Filed: Jul. 31, 2003

(65) Prior Publication Data

US 2005/0022804 A1 Feb. 3, 2005

(51) Int. Cl.[7] .............................................. F24C 9/00
(52) U.S. Cl. ........................ 126/299 D; 126/34; 126/53; 165/901; 165/904
(58) Field of Search ..................... 126/299 R, 299 D, 126/34, 53; 165/49, 901, 904; 122/18.1, 19.1

(56) References Cited

U.S. PATENT DOCUMENTS

| | | | |
|---|---|---|---|
| 3,980,072 A | * | 9/1976 | Jacobs ..................... 126/299 D |
| 4,084,745 A | | 4/1978 | Jones |
| 4,122,834 A | | 10/1978 | Jacobs |
| 4,175,614 A | | 11/1979 | Huggins |
| 4,483,310 A | | 11/1984 | Kelly |
| 5,311,930 A | * | 5/1994 | Bruenn ........................ 165/901 |
| 5,687,707 A | | 11/1997 | Prasser |
| 6,334,411 B1 | * | 1/2002 | Lesage et al. ............. 122/19.1 |
| 6,591,788 B2 | * | 7/2003 | Hughes et al. ........... 122/13.01 |
| 6,612,267 B1 | * | 9/2003 | West ......................... 122/18.1 |

OTHER PUBLICATIONS

AVTEC Catalog 1983.

* cited by examiner

Primary Examiner—Jiping Lu
(74) Attorney, Agent, or Firm—John E. Simms, Jr.

(57) ABSTRACT

A cooking heat absorber comprising a radiator assembly for absorbing heat radiated from a cooking surface and from a flue riser, on commercial surface cooking equipment and a tank assembly for holding a fluid and circulating the fluid through the radiator assembly to cool the radiator assembly and warm the fluid. The cooled radiator assembly reduces the amount of radiant heat dispersed from the surface cooking equipment and maintains a more comfortable temperature in a commercial kitchen. The tank assembly includes conduits to supply the warmed fluid, which may be water, to a water heater for reducing the energy requirements of the water heater. The tank assembly circulates a stored quantity of fluid through the radiator assembly, where the fluid is warmed, independent of any use of water from the water heater.

4 Claims, 3 Drawing Sheets

COOKING HEAT ABSORBER

BACKGROUND

Commercial kitchens typically include cooking equipment having a cooking surface, which radiates heat directly upward from the cooling surface. Cooking ranges and open topped fryers and other cookers are surface cooking equipment of this type. Heat from the cooling equipment is directed upward onto the food being cooked and is also released into the kitchen in the area directly above and surrounding the cooking equipment. Cooking, on this type of equipment, generally requires that individuals remain directly in front of the cooking equipment, to tend the food, during the cooking process. Up to 32% of the energy input to fire the surface cooking equipment is radiated to the individuals in front of the equipment and to the surrounding area. The conditions can become very uncomfortable because of the elevated temperature. An exhaust fan is often required by local regulations and the fan operates to remove most of the sensible and latent heat; however, the radiated heat, which is absorbed by the individuals and the fixtures, in the surrounding area is not removed.

In the case of gas fired cooking equipment, an additional 25% of the energy used to fire the equipment is exhausted with the flue gases. The flue gas rises at the back of the cooking equipment and, in the case of ranges and fryers, can reach temperatures as high as 600 to 1000° F. The temperature of the flue itself approaches the temperature of the flue gas and the flue, which is generally located at the back of the equipment and above the cooking surface, radiates heat to the individuals in the surrounding area.

Temperatures as high as 140° F. have been recorded at the breathing level of a cook standing in front of a cooking range, with an exhaust fan in operation. Although this is an extreme situation, it is not unusual to experience ambient temperatures ranging from 100 to 120° F., depending on the type of cooking equipment. Systems have been developed to make use of the heat, which is generated by cooking equipment. The heat can be reclaimed by a heat exchanger and used to raise the temperature of water to be used for dishwashing and other purposes where heated water is required. U.S. Pat. No. 5,687,707, to Prasser discloses a combination filter and heat exchanger which makes use of fluid circulating in the path of gases being exhausted from the cooking equipment. The system reclaims heat for use in heating water but the heat is absorbed from gases which are already being carried away from the kitchen; however, the system does reduce the temperate in the area occupied by kitchen workers. U.S. Pat. No. 4,483,310, to Kelly discloses a system of coils disposed within a warming oven. The system also supplies pre-heated water for use as needed but the absorbtion of heat from inside the warming oven reduces the temperature of the warming oven and the size of the coils and the velocity of the fluid flow must be balanced to provide the desired degree of warming of the fluid without unduly reducing the temperature of the warming oven.

There is a need for a system, which can be easily installed in conjunction with existing surface cooking equipment, and which can reclaim radiant heat without reducing the temperature of the cooking surface. There is a need for a system which can make use of the reclaimed beat for heating water for use in the kitchen or other parts of the building. There is a need for a system which can be activated as it is needed to cool the area in front of surface cooking equipment and which operates without the need for complex regulating mechanisms.

SUMMARY OF THE INVENTION

It is an object of the current invention to provide a heat reclaimer which can be easily installed in conjunction with existing surface cooking equipment.

It is an object of the present invention to provide a beat reclaiming system which can reclaim radiant heat from the area of surface cooking equipment to cool the area near the cooking equipment without reducing the temperature of the cooking surface.

It is a further object of the present invention to provide a system which can make use of reclaimed heat to warm water for dishwashing and other purposes.

It is another object of the present invention to provide a system which can be easily activated when needed and which can operate without the need for extensive regulating mechanisms.

In accordance with the stated objects, the present invention is a heat reclaimer for radiant heat from a cooking surfaces and from a flue. The heat reclaimer comprises a radiator assembly and a tank assembly. The radiator assembly comprises a front panel, a back panel and sides, which join to define an inside space. A plurality of walls are mounted in the inside space and extend between the front panel and the back panel. The walls are positioned so as to define a single elongated chamber, having a circuitous shape and occupying the inside space. A radiator inlet and a radiator outlet are provided, which are in fluid communication with the elongated chamber and are located at extreme opposite ends of the chamber.

The tank assembly comprises a rigid watertight container having a first outlet, connected by a first fluid carrying conduit to the radiator inlet for drawing water from the tank and carrying it to the radiator assembly. An inlet is provided, on the container, and is connected by a second fluid carrying conduit to the radiator assembly outlet for carrying water from the radiator assembly to the tank. A second outlet is provided, on the container, and is connected by a third fluid carrying conduit to a water heater, for allowing water to flow into the water heater. A continuous pressurized water supply is connected to the first fluid carrying conduit by a fourth fluid carrying conduit. Circulating means are provided in fluid communication with the first fluid carrying conduit for circulating water out from the container, through the first fluid carrying conduit, through the radiator assembly, through the second fluid carrying conduit and into the container. Energizing means are provided for energizing the circulating means and controlling means are provided for operably controlling the energizing means.

Ideally, the radiator assembly of the present invention is positioned above and to the rear of surface cooking equipment so that the front panel is exposed to radiant heat from the cooling surface and so that the back panel is exposed to radiant heat from the surface of the flue carrying the flue gases being exhausted from the cooking equipment. When the cooking area becomes uncomfortably hot, the circulating means may be manually energized to cause water to circulate through the radiator assembly where the water absorbs radiant heat through the front panel and the rear panel. The temperature of the panels decreases and less heat is re-radiated to the cooking area. The cooking surface remains hot for use in cooking food. The water, which has been warmed by the radiant heat is circulated to the container where it remains until a hot water tap is opened during normal use of the building water supply. The release of pressure, caused by the opening of the hot water tap, produces a void in the water heater, which fills from the container of the present invention, which, in turn, fills from the water supply line. Typically, a water heater is thermostatically controlled and is adjusted to maintain a quantity of water at a predetermined temperature. The water heater consumes energy, which it uses to raise the temperature of a quantity of water from the temperature of the water supply to the predetermined temperature. The warmed water, which is supplied to the water heater, by the present invention, reduces the amount of energy consumed by the water heater.

If the cooking process includes the production of heated flue gases, which rise in a flue adjacent to the back panel of the present invention, the water is warmed to a greater degree because heat is transferred by convection from the flue gases to the water circulating in the radiator assembly. The water circulating back to the tank may reach a temperature of 100° F. and further increase the energy savings of the water heater while continuing to shield the cooking area from the radiant heat from the flue.

The present invention may be installed by disposing the radiator assembly above and to the rear of the surface cooking equipment and installing the tank assembly in proximity to the radiator assembly. Water conduit connections must be installed to connect the water supply to the first fluid carrying conduit of the present invention and to connect the container to the building water heater. Also, the tank assembly must be connected to the radiator assembly to provide for circulation of water out from the container, through the radiator assembly and back to the container. There is no need to alter or replace any part of the cooking equipment.

DETAILED DESCRIPTION OF THE PREFERRED EMBODIMENT

Figure 1:
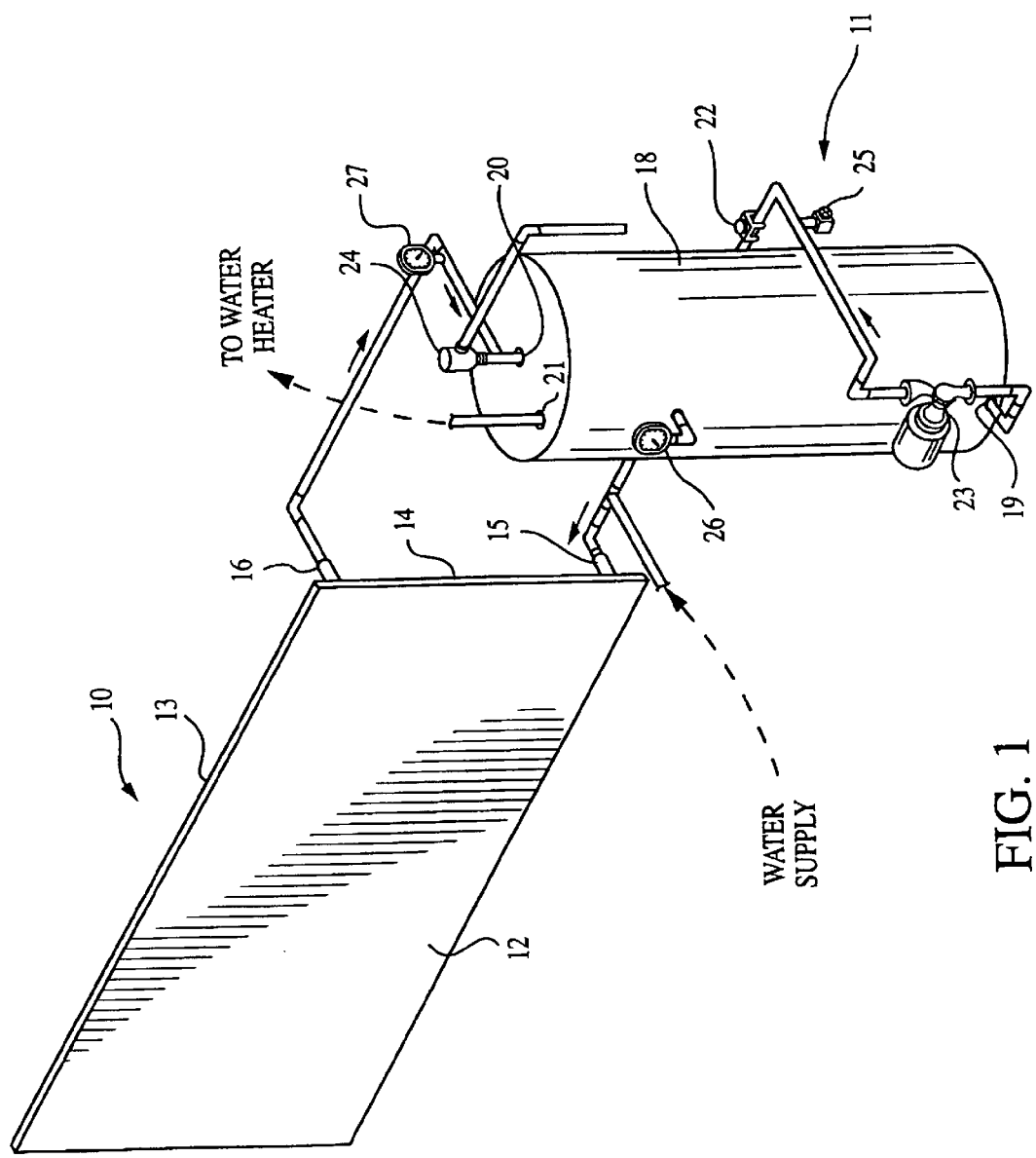
FIG. 1 is a perspective view of a heat reclaimer of the present invention.

The present invention is a heat reclaimer comprising a radiator assembly 10 and a tank assembly 11, as shown in FIG. 1. The radiator assembly comprises a front panel 12 and a back panel 13, preferably formed of rigid rectangular sheets, of equal size and is intended for placement above and to the rear of surface cooking equipment in a vertical orientation. A plurality of adjacent sides 14 extend from edges of the front panel 12 to edges of the back panel 13 forming an inside space between the front panel 12 and the back panel 13. The sides 14 are affixed to the front panel 12, the back panel 13 and to each other by welding or other suitable means to enclose the inside space in watertight fashion. Stainless steel is a suitable material for forming the front panel 12, back panel 13 and sides 14. A radiator inlet 15 is provided, in fluid communication with the inside space, for allowing fluid to enter and a radiator outlet 16 is provided, in fluid communication with the inside space, for allowing fluid to exit. It is preferable that the radiator inlet 15 and radiator outlet 16 are permanently mounted on, and protrude through the back panel 13. It is preferred that the radiator inlet 15 and radiator outlet 16 are provided with fittings, on the protruding portion, for connection to standard water service piping.

Figure 2:
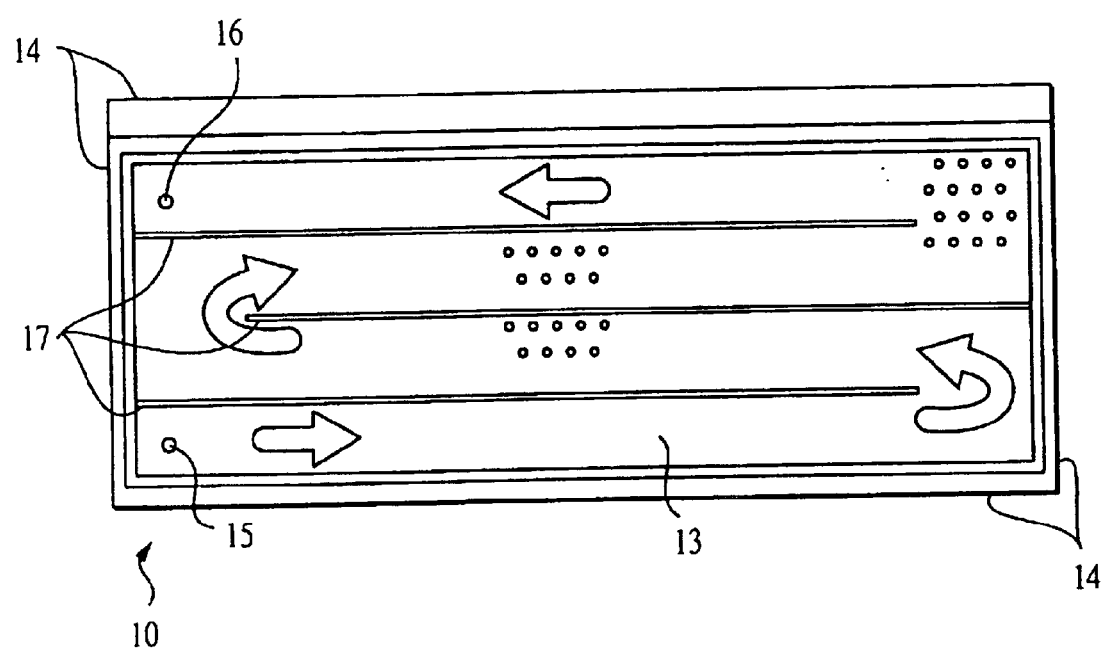
FIG. 2 is a front elevation view of the radiator assembly of the present invention shown with the front panel cut away to reveal the inside chamber.
Figure 3:
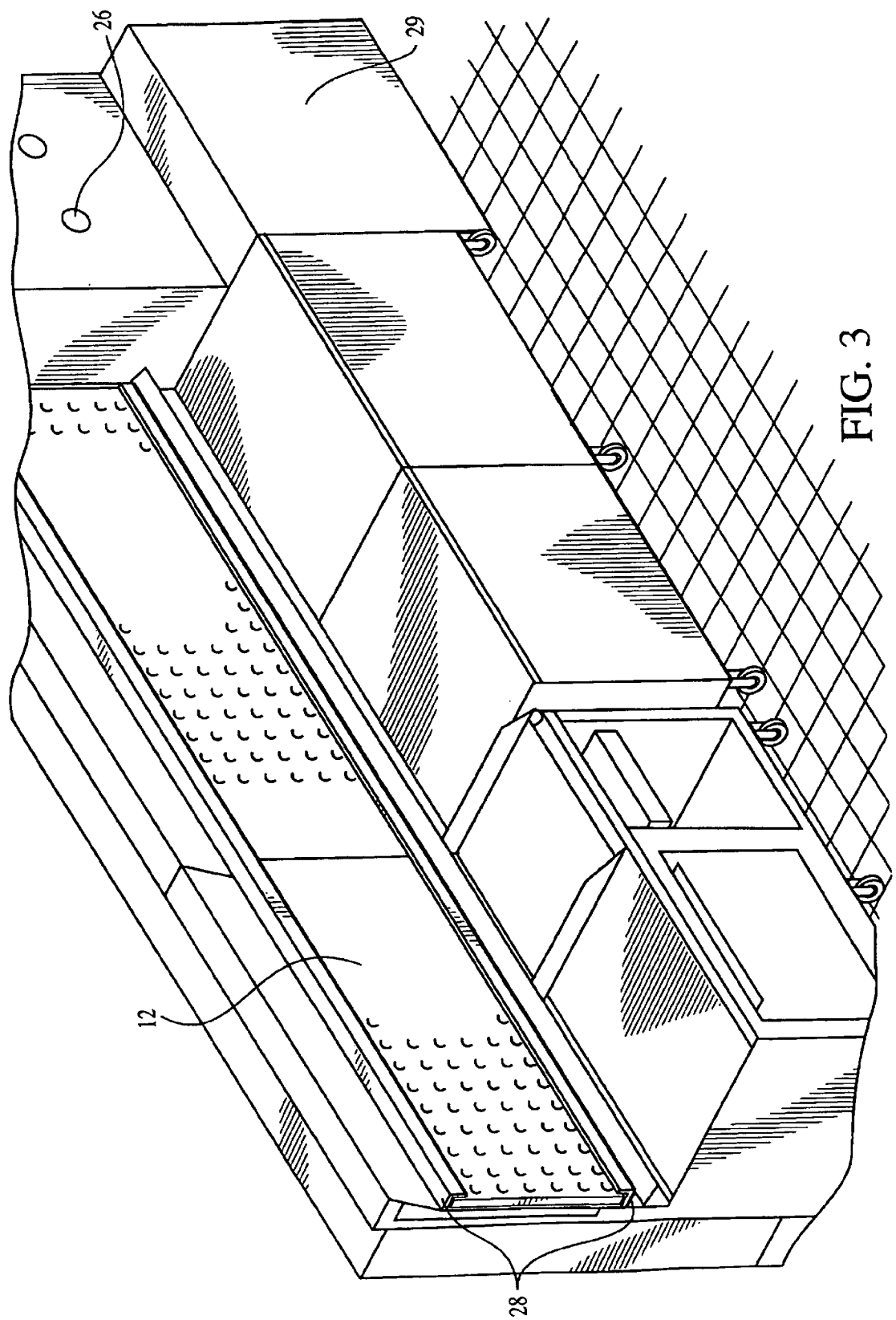
FIG. 3 is a perspective view of the heat reclaimer installed at the rear of a battery of gas fired surface cooking equipment and with the tank assembly enclosed in a cabinet.

A plurality of walls 17 are mounted in the inside space, as shown in FIG. 2, and extend from the front panel 12 to the back panel 13. The walls 17 are arranged to form a single chamber, within the inside space, such that the chamber has an elongated form, a relatively narrow width and extends in a circuitous shape with the radiator inlet 15 and the radiator outlet 16 spaced apart at extreme opposite ends of the chamber, for causing fluid entering the radiator inlet 15 to travel the entire length of the chamber before exiting through the radiator outlet 16.

In the preferred embodiment, the radiator assembly 10, is a Mueller TM, Type 6 Double Embossed, 18 gauge, type 304 stainless steel 4-pass template, 29 inches wide, 600 PSIG, inflation resulting in 0.125 inch pillow, with one inch end connections.

The tank assembly 11 comprises a rigid, vertically extending watertight container 18 having a first outlet 19 for connection by a first fluid carrying conduit to the radiator inlet 15. An inlet 20 is provided, for connection by a second fluid carrying conduit to the radiator outlet 16. A second outlet 21 is provided, for connection by a third fluid carrying conduit to a water heater. A continuous pressurized water supply is connected to the first fluid carrying conduit by a fourth fluid carrying conduit. The first outlet 19, the inlet 20 and the second outlet 21 are preferably constructed and installed by conventional connector means for providing a watertight connection to a water tank. The radiator inlet 15 and the radiator outlet 16, are likewise preferably constructed and installed by conventional connector means for providing watertight connections. The first outlet 19 and the inlet 20 together with the first and second fluid carrying conduits provide a fluid circuit from the container 18 through the first outlet 19 to the radiator inlet 15, through the chamber, through the radiator outlet 16, to the inlet 20 and into the container 18. The fluid carrying conduits are preferably standard water system piping. The first outlet 19 is preferably positioned proximate to the lower end of the container 18 and the inlet 20 and the second outlet 21 are preferable positioned proximate to the upper end of the container 18.

In the preferred embodiment, a check valve 22 is provided on the first fluid carrying conduit, as shown in FIG. 1, for preventing the flow of water back toward the container 18. A second check valve (not shown) would be installed in the water supply line to prevent back flow, according to standard practice.

Circulating means are provided for urging fluid to circulate through the fluid circuit. In the preferred embodiment, circulating means are provided by a circulating pump 23 mounted on the container 18 and in fluid communication with the fluid carrying conduit forming a portion of the fluid circuit. The circulating pump 23 is connected to an energizing circuit and provided with operable means of control, such as a switch. It is contemplated that the switch may be a variable type for operating the circulating pump 23 at variable speeds. A Taco TM, III Red Baron® circulator with one inch connections and a ⅛ horsepower motor is a suitable circulating pump 23.

In the preferred embodiment, a pressure/temperature relief valve 24 is provided and is connected to the inlet 20, in fluid communication therewith, for releasing excess pressure from the container 18. The pressure/temperature relief valve 24 is connected to a fifth fluid carrying conduit having an open end for releasing pressure at a location selected for maximum safety. A drain valve 25 is provided and is connected to the first fluid carrying conduit forming a portion of the fluid circuit, in fluid communication therewith, for draining the radiator assembly 10. The drain valve 25 is connected to a sixth fluid carrying conduit having an open end for draining at a location selected for maximum safety. The Taco TM 321-¾ inch ASME relief valve is suitable for the pressure/temperature relief valve 24 and a predetermined pressure of 150 pounds per square inch and a temperature of 200° F. are recommended settings.

In the preferred embodiment, a first thermometer 26 is mounted on the container 18 having an extension probe communicating with the inside of the container 18 through a watertight fitting and a readable scale, preferably a dial, visible from outside the container 18, for providing means to measure the temperature inside the container 18. Also, a second thermometer 27 is mounted on a fluid carrying conduit forming a portion of the fluid circuit, with an extension probe communicating with the inside of the fluid carrying conduit through a watertight fitting and a readable scale, preferably a dial, visible from outside the water carrying conduit, for providing means to measure the temperature inside the fluid circuit.

The heat reclaimer, of the present invention, is intended for installation on existing surface cooking equipment, having a flue riser or rear plate at the back of the cooking surface, without the necessity for extensive alteration of the equipment. In the preferred embodiment, two or more elongated brackets 28 are mounted on the flue riser or rear plate. At least two of the brackets 28 are mounted horizontally and spaced apart a distance matching the vertical dimension of the radiator assembly 10. Each of the brackets 28 includes an integral portion extending outward from the flue riser and terminating in a perpendicular flange extending toward the other of the brackets 28, for providing a track into which the radiator assembly may be slideably disposed and retained in position at the rear of the surface cooking equipment, with the front panel 12 exposed to the ambient air above the cooking surface and with the back panel 13 adjacent to the flue riser or rear plate of the cooking equipment. In some circumstances, it be necessary or advantageous to install a flap, on the flue riser, below the radiator assembly 10 for channeling the flue gases into the flue riser. In some circumstances, it may be necessary or advantageous to install a flue extension, on the flue riser, above the radiator assembly 10 to channel the flue gases toward the air exhaust system. Stainless steel of 16 gauge is an appropriate material for the flap and the flue extension.

In a situation where a large battery of surface cooking equipment is installed in a line, it is anticipated that the present invention may be constructed with a plurality of radiator assemblies 10 connected in the same system. The fluid carrying conduit, which connects the first outlet 19 to the radiator inlet 15 is provided with a branching connector, for dividing the flow into two or more separate branches leading to separate radiator assemblies 10 and likewise, the fluid carrying conduit which connects the radiator outlet 16 to the container inlet 20 is provided with a branching connector, for receiving flow from the radiator outlets 16 of two or more radiator assemblies 10.

For aesthetic purposes, it is desirable that the tank assembly 11 may be enclosed and concealed from view, in a cabinet 29, preferably constructed of 18 gauge stainless steel. It is also desirable that the first thermometer 27 and the second thermometer 27 be configured such that the dials may be read from outside the cabinet 29.

The heat reclaimer of the present invention is intended to be installed on surface cooking equipment, in commercial kitchens. When the ambient air becomes uncomfortably hot due to radiant heat, from the cooking surfaces, the circulating pump 23 may be energized for circulating water from the container 18 through the radiator assembly 10 and back to the container 18. The water, which passes through the radiator assembly 10, is exposed to heat radiating from the cooking surface and from the flue riser. The water absorbs radiated heat, reducing the temperature of the front panel 12 and the back panel 13 and dec ing the re-radiation of heat to the cooking area, resulting in a cooler cooking area without reduction of the temperature of the cooking surface. The present invention does not absorb beat being used to cook food, on the cooking surface, but absorbs excess heat radiated to the radiator assembly 10. The heated water is returned to the container 18 where it remains until hot water is needed for use in the kitchen or in another part of a building. As the process of cooking continues, the temperature of the water in the container 18 may continue to rise. When hot water is needed and a hot water tap is opened, the pressure in the water heater is released causing the water to flow from the water heater to the tap. The flow of water causes a void in the water heater which reduces pressure in the fluid carrying conduit connected to the second outlet 21 on the container 18 and causes water to flow from the container 18 to the water heater. The container 18 refills from the pressurize water supply line, through the inlet 20 until the pressure in the container 18 and the water heater are equalized. The water supplying the water heater is the heated water from the container 18 instead of the unheated water from the water supply and the water heater uses less energy as a result.

For a twelve foot cooking battery of gas fired equipment, in a kitchen which receives an incoming water supply at 55° F. and requires eight gallons per minute of hot water at 140° F., the system of the present invention will supply water to the water heater at a temperature of 85° F. and reduce the range by which the water heater must raise the temperature of supply water by 30° F. The energy required to raise a gallon of water one farenheit degree equals 8.33 British Thermal Units×8 gallons per minute×60 minutes per hour= 120,000 British Thermal Units/hour, which is equivalent to 10 tons of air conditioning. When the system of the present invention is not in use, the water heater receives a supply of water through the container but the water supply is not warmed and is supplied at its initial temperature of 55° F. and the water heater must raise the water temperature by 85° F. to reach the predetermined temperature of 140° F. When the system of the present invention is in use, the water heater is supplied with water from the tank, at varying temperatures above 55°, thereby reducing the range by which the temperature must be increased by up to approximately 30° F. The energy savings realized by the water heater may be expressed as the ratio of 30°/185°=35% when the cooking equipment is in full use.

Having fully described the present invention, it may be understood that minor variations may be introduced without departing from the scope of the invention as disclosed and claimed herein.

I claim:

1. A cooking heat absorber for reclaiming and removing heat radiated from a cooking surface and from a flue riser in surface cooking equipment, comprising:
    a radiator assembly for absorbing radiated heat comprising:
    a front panel, a back panel and sides joined to define an inside space;
    one or more walls extending from said front panel to said back panel and defining an elongated chamber within said inside space;

a radiator inlet, for allowing fluid to enter, and a radiator outlet, for allowing fluid to exit, both connected to said radiator assembly and in fluid communication with said chamber;

a tank assembly for holding fluid and for circulating said fluid to and from said radiator assembly comprising:

a rigid watertight container;

a first outlet to said container for connection by a fluid carrying conduit means to a continuous pressurized water supply and to said radiator inlet;

an inlet to said container for connection by fluid carrying conduit means to said radiator outlet for forming a fluid circuit;

a second outlet from said container for connection by fluid carrying conduit to a water heater supplying water to said water heater;

a circulating pump operably connected to said fluid circuit for urging a fluid through said circuit;

energizing means operably connected to said circulating pump for energizing said circulating pump.

2. The cooking heat absorber of claim 1, wherein said elongated chamber is relatively narrow, of circuitous shape, and positioned such that said radiator inlet and said radiator outlet are located at extreme opposite ends of said chamber for causing fluid entering through said radiator inlet to traverse the length of said chamber before exiting through said radiator outlet.

3. The cooking heat absorber of claim 1, wherein said energizing means include means for variably energizing said circulating pump for controllably moderating the rate of fluid flow through said fluid circuit.

4. The cooking heat absorber of claim 1, further comprising:

a first thermometer attached to said container and having visible readout means and a probe communicating with the inside of said container, for measuring and displaying the temperature of said fluid;

a second thermometer attached to said fluid carrying conduit forming a part of said fluid circuit and having visible readout means and a probe communicating with the inside of said fluid circuit, for measuring and displaying the temperature of said fluid;

a pressure/temperature relief valve means connected to said container, in fluid communication with the inside of said container for releasing pressure in excess of a predetermined value, from said container.

* * * * *

UNITED STATES PATENT AND TRADEMARK OFFICE
CERTIFICATE OF CORRECTION

PATENT NO. : 6,866,036 B2
DATED : March 15, 2005
INVENTOR(S) : Eugene Albert Jacobs It is certified that error appears in the above-identified patent and that said Letters Patent is hereby corrected as shown below:

Column 1,
Line 7, "upward from the cooling surface.", should read -- upward from the cooking surface. --.
Line 9, "Heat from the cooling equipment", should read -- Heat from the cooking equipment --.

Signed and Sealed this

Ninth Day of May, 2006

JON W. DUDAS
*Director of the United States Patent and Trademark Office*